United States Patent
Hayashi et al.

(10) Patent No.: US 9,703,717 B2
(45) Date of Patent: Jul. 11, 2017

(54) COMPUTER SYSTEM AND CONTROL METHOD

(71) Applicant: Hitachi, Ltd., Tokyo (JP)

(72) Inventors: Shinichi Hayashi, Tokyo (JP); Yusuke Funaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/767,056

(22) PCT Filed: Jul. 29, 2013

(86) PCT No.: PCT/JP2013/070453
§ 371 (c)(1),
(2) Date: Aug. 11, 2015

(87) PCT Pub. No.: WO2015/015550
PCT Pub. Date: Feb. 5, 2015

(65) Prior Publication Data
US 2016/0132433 A1    May 12, 2016

(51) Int. Cl.
*G06F 12/08* (2016.01)
*G06F 12/0888* (2016.01)
*G06F 12/0866* (2016.01)
*G06F 3/06* (2006.01)

(52) U.S. Cl.
CPC .......... *G06F 12/0888* (2013.01); *G06F 3/061* (2013.01); *G06F 3/0604* (2013.01); *G06F 3/067* (2013.01); *G06F 3/0631* (2013.01); *G06F 3/0649* (2013.01); *G06F 3/0685* (2013.01); *G06F 12/0866* (2013.01); *G06F 2212/604* (2013.01)

(58) Field of Classification Search
CPC ...... G06F 3/061; G06F 3/0649; G06F 3/0685; G06F 3/0631; G06F 3/067; G06F 3/0604; G06F 12/0866; G06F 12/0888
See application file for complete search history.

(56) References Cited

U.S. PATENT DOCUMENTS

| | | | |
|---|---|---|---|
| 8,321,645 B2* | 11/2012 | Rabii | G06F 3/0605 711/117 |
| 2003/0140198 A1 | 7/2003 | Ninose et al. | |
| 2007/0083575 A1* | 4/2007 | Leung | G06F 17/30082 707/705 |

(Continued)

OTHER PUBLICATIONS

International Search Report of PCT/JP2013/070453.

*Primary Examiner* — Hiep Nguyen
(74) *Attorney, Agent, or Firm* — Mattingly & Malur, PC

(57) ABSTRACT

A computer system according to the present invention is composed of a server 200 having a flash memory drive 204 for cache, a storage system 260 having storage tiers composed of an SSD 267 and an HDD 268, and a management server having a page tier determination program 503 for determining the storage tier to which data is to be stored. The page tier determination program 503 migrates data having a high read access rate out of the pages having a high cache rate to the flash memory drive 204 to a storage tier of the HDD 268, and confirms so that data is not stored in a duplicated manner to the flash memory drive 204 and the SSD 267. Further, the data having a relatively high write access rate is migrated to the storage tier of the SSD 267 so as to prevent deterioration of write process performance.

15 Claims, 16 Drawing Sheets

(56) References Cited

U.S. PATENT DOCUMENTS

| | | | | |
|---|---|---|---|---|
| 2012/0131278 A1* | 5/2012 | Chang | ................. | G06F 12/0893 711/118 |
| 2013/0036250 A1* | 2/2013 | Hayashi | .................. | G06F 3/061 711/101 |
| 2013/0238832 A1* | 9/2013 | Dronamraju | .......... | G06F 3/0608 711/103 |
| 2013/0282982 A1* | 10/2013 | Hayashi | .................. | G06F 3/061 711/118 |
| 2013/0290598 A1* | 10/2013 | Fiske | .................... | G06F 3/0625 711/103 |
| 2013/0346672 A1* | 12/2013 | Sengupta | ............ | G06F 12/0871 711/103 |

* cited by examiner

Cache Control Information (304)

| Cache Source Volume Name (601) | Start Address (602) | Length (603) | Cache Destination Volume Name (604) | Start Address (605) | Last Accessed Time (606) |
|---|---|---|---|---|---|
| Vol A | 0 | 10 | Server Flash A | 0 | 16:29 |
| Vol A | 20 | 20 | Server Flash A | 10 | 16:22 |
| Vol B | 0 | 10 | Server Flash A | 100 | 16:10 |

RAID Group Information

| RAID Group Name | Drive Name | RAID Level | Drive Type | Capacity |
|---|---|---|---|---|
| RG A | SSD A, SSD B, SSD C, SSD D | RAID 5 | SSD SLC | 100 GB |
| RG B | HDD A, HDD B, HDD C, HDD D | RAID 5 | HDD SAS 15,000 rpm | 300 GB |
| RG C | HDD E, HDD F, HDD G, HDD H | RAID 5 | HDD SATA 7,200 rpm | 1 TB |

Logical Volume Information

| Logical Volume Name | Length | RAID Group Name | Start Address |
|---|---|---|---|
| L-Vol A | $20 \times 10^9$ | RG A | 0 |
| L-Vol B | $100 \times 10^9$ | RG B | 0 |
| L-Vol C | $300 \times 10^9$ | RG C | 0 |
|  |  |  |  |

405 — Virtual Volume Information

| Page ID | Virtual Volume Name | Start Address (MB) | Logical Volume Name | Start Address (MB) | Number of Reads | Number of Writes | |
|---|---|---|---|---|---|---|---|
| Page 0 | Vol A | 0 | L-Vol A | 0 | 95 | 5 | 1108 |
| Page 1 | Vol A | 10 | L-Vol A | 10 | 30 | 30 | 1109 |
| Page 2 | Vol A | 20 | L-Vol B | 0 | 10 | 40 | 1110 |
|  |  |  |  |  |  |  |  |

406 — Tier Definition Information

| Tier | Drive Type | |
|---|---|---|
| 1 | SSD SLC | 1203 |
| 2 | HDD SAS 15,000 rpm | 1204 |
| 3 | HDD SATA 7,200 rpm | 1205 |

Page Tier Policy

| Read Rate Condition | Server Cache Rate Condition | Tier |
|---|---|---|
| Over 90 % | Over 70 % | 2 |
| Below 70 % | Over 70 % | 1 |

Page Tier Policy Entry Screen

| Read Rate | Server Cache Rate | Tier |
|---|---|---|
| Over 99 % | Over 70 % | 2 |
| Below 70 % | Over 70 % | 1 |
|  |  |  |

1701  1702  1703
1705
1706

1707

Set

Fig. 15

305 — Object Location Information

| Object Name | Object Type | Start Address | Length | Volume Name | Start Address | Read Rate | Cache Rate | |
|---|---|---|---|---|---|---|---|---|
| Table A | Table | 0 | 20 | Vol A | 0 | 50% | 60% | 709 |
| Table A | Table | 20 | 20 | Vol A | 20 | 90% | 60% | 710 |
| Index B | Index | 0 | 10 | Vol A | 100 | 60% | 90% | 711 |
| Log A | Log | 0 | 10 | Vol B | 20 | 0% | 20% | 712 |

Columns: 701, 702, 703, 704, 705, 706, 707, 708

Fig. 16

Object Status Information (508)

| Object Name (1801) | Read Rate (1802) | Server Cache Rate (1803) |
|---|---|---|
| Table A | 60% | 80% | (1804)
| Index B | 90% | 80% | (1805)

Fig. 17

Storage Cache Control Information (408)

| Cache Source Volume Name (1301) | Start Address (1302) | Length (1303) | Cache Destination Volume Name (1304) | Start Address (1305) | Reflec-tion (1306) | Last Accessed Time (1307) |
|---|---|---|---|---|---|---|
| Vol A | 0 | 10 | L-Vol C | 0 | Reflected | 16:29 | (1308)
| Vol A | 20 | 10 | L-Vol C | 10 | Not Reflected | 18:00 | (1309)

Page Tier Information

| Volume Name | Start Address (LBA) | End Address (LBA) | Tier |
|---|---|---|---|
| Vol A | 0 | 20479 | 1 |
| Vol A | 20480 | 40959 | 1 |
| Vol A | 40960 | 61439 | 2 |
| ... | | | |

5021  5022  5023  5024

COMPUTER SYSTEM AND CONTROL METHOD

TECHNICAL FIELD

The present invention relates to a computer system, and specifically, relates to an art of managing storage areas in a computer system having a storage system with storage tiers composed of different types of storage media, and a server having a cache.

BACKGROUND ART

Recently, the use of SSDs (Solid State Drives) which are storage media having higher performance than HDDs (Hard Disk Drives) is spreading. In general, SSDs are more expensive than HDDs, so that if it is necessary to construct and operate computer systems within a limited budget, the storage areas of the SSDs must be utilized efficiently, since it is not possible to allocate a large SSD capacity. One prior art technique for efficiently utilizing a small capacity of high-performance storage media is a hierarchical storage management (tiered storage management) technique that provides to a storage system a storage tier composed of an expensive and high-performance storage media and a low-performance and inexpensive storage media, wherein data having a high I/O (Input/Output) frequency is placed onto a high-performance storage media (high-level storage tier) and data having a low I/O frequency is placed onto an inexpensive storage media (low-level storage tier). Further, a data cache technique is provided, wherein data temporarily read from the storage system is copied to a storage area in the server (server cache), and subsequent accesses are performed using data stored in the server cache.

One method for further utilizing high-performance storage media efficiently is a method for controlling a cache memory in a computer system having cache memories both in a server and in a storage system, wherein the system is controlled so that data cached in the cache memory of the server will not be cached in the cache memory of the storage system, and data cached in the storage system will not be cached in the cache memory of the server (Patent Literature 1).

CITATION LIST

Patent Literature

[PTL 1]
United States Patent Application Publication No. 2003/0140198

SUMMARY OF INVENTION

Technical Problem

When both a tiered storage management technique for managing storage tiers composed of SSDs and HDDs and a cache technique in the server are utilized, although the data placed onto an upper-level storage tier is already in a state capable of being accessed at high speed, the data may also be cached in the server cache, according to which high-speed storage area is consumed wastefully. Patent Literature 1 teaches preventing duplication of data both in the server cache and the storage system cache, but lacks to consider the storage tier in the storage system.

Further, since the server uses the server cache under write-through mode for data preservation, improvement of performance by the server cache during write operation cannot be expected. Therefore, if the data has a high write frequency, even if the data is cached in the server, the performance cannot be improved when the data is stored in a lower-level tier of the storage system.

Solution to Problem

The present invention aims at solving the above-mentioned problems by providing a computer system including a storage system having a plurality of storage tiers composed of multiple types of storage media having different performances, and a server having a server cache for caching a portion of the data read from the storage system, wherein data placement is controlled to store as much data as possible in the server cache or the upper-level storage tier of the storage system. Specifically, control is performed so that same data will not be stored in a duplicated manner in both the server cache and the upper-level storage tier of the storage system.

There are two methods for executing control of data placement so that same data will not be stored in a duplicated manner, which are a method where the storage system controls the data placement, and a method where the sever controls the data placement. When the storage system controls data placement, in the storage system, control is performed so that out of the data cached in the server cache, the data having a high read rate is placed onto the lower-level storage tier, and the data having a high write rate is placed onto the high-level storage tier.

Further, when the server controls the data placement, control is performed so that the data stored in the upper-level storage tier of the storage system is not cached in the server cache, and the data stored in the lower-level storage tier of the storage system is cached in the server cache.

Advantageous Effects of Invention

According to the prior art system, data having a high I/O frequency tends to be placed onto the high-level storage tier of the storage system and also cached in the server cache, therefore, the same data will be stored in a duplicated manner to both the server cache and the upper-level storage tier of the storage system, and high-speed storage media will be consumed wastefully. According to the computer system of the present invention, control is performed so as to prevent data stored in the server cache from being placed onto the high-level storage tier of the storage system, or to prevent data placed onto the upper-level storage tier of the storage system from being cached in the server cache, so that larger amount of data can be placed onto the high-speed storage media such as the server cache or the upper-level storage tier of the storage system, and the I/O performance of the computer system can thereby be improved. According to the computer system of the present invention, the data cached in the server cache and having a high write rate is placed onto the high-speed storage tier of the storage system, so that the I/O performance of the data having a high write access can also be improved.

BRIEF DESCRIPTION OF DRAWINGS

FIG. 7 shows a RAID group information 402.

FIG. 8 shows a logical volume information 403.

FIG. 9 shows a virtual volume information 405.

FIG. 10 show a tier definition information 406.

FIG. 13 shows a page tier policy 505.

FIG. 14 shows a page tier policy entry screen 5060.

FIG. 15 shows an object location information 305.

FIG. 16 shows an object status information 508.

FIG. 17 shows a storage cache control information 408.

FIG. 23 shows a page tier information 520.

DESCRIPTION OF EMBODIMENTS

Figure 1:
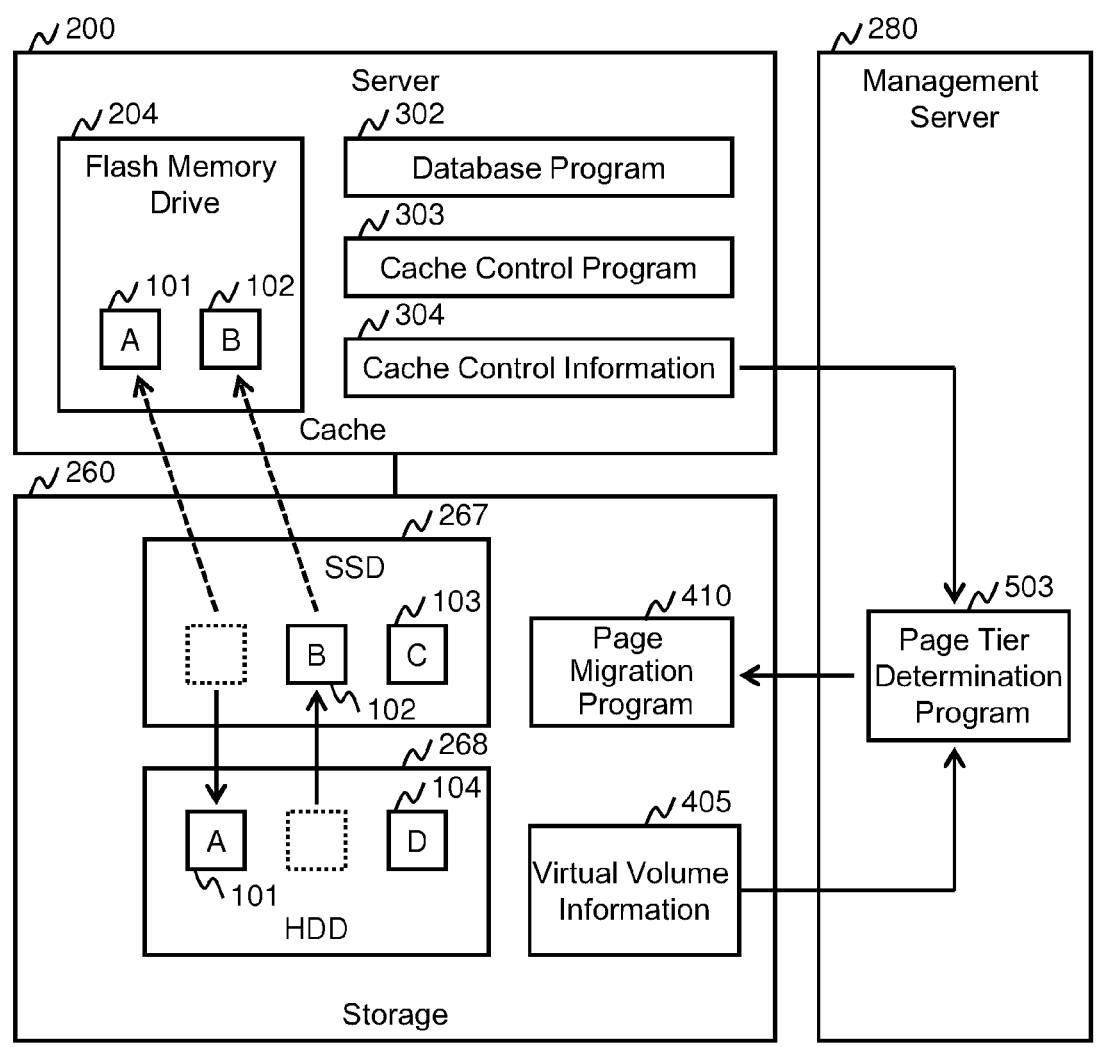
FIG. 1 shows an outline of embodiment 1.

The outline of the present invention will be described with reference to FIG. 1. It should be noted that the present invention is not restricted to the preferred embodiments illustrated hereafter.

The present system is a computer system having a server 200 with a database program 302 and a cache control program 303 operated therein, a storage system 260 having at least two types of storage tiers, an SSD 267 and an HDD 268, and a management server 280 having a page tier determination program 503, which are connected via a communication network. The storage system 260 stores and manages the number of read/write accesses that have occurred during a predetermined period of time per fixed length area, which is called a page, in a virtual volume information 405. Further, the storage system 260 has a function to execute data migration among storage tiers in page units. The server 200 caches a portion of the accessed data in a flash memory drive 204, and stores information related to the cached data in a cache control information 304 for management.

The page tier determination program 503 acquires the cache control information 304 from the server 200 and acquires the virtual volume information 405 from the storage system 260 to determine the storage tier to which the respective pages are to be allocated, and sends an instruction to a page migration program 410 to migrate the page to the determined tier. The page migration program 410 migrates the pages based on the instruction. Specifically, the page tier determination program 503 determines that data of page A 101 having a high read access rate (in which the read access rate is higher than a first threshold value) out of pages in which the rate of having data cached in the server is high should be placed onto the HDD 268, and that data of page B 102 having a low read access rate (in which the read access rate is lower than a second threshold value; meaning that it has a high write access rate) should be placed onto the SSD 267.

According to the present invention, data having a high read access out of the data cached in the server are placed onto the SSD in the storage system, so that greater amount of data are placed onto a high speed storage media, and the I/O performance of the computer system can be improved. Further, out of the data being cached, the data having a relatively high write access can be placed onto the SSD in the storage system, so that deterioration of performance during write accesses can be prevented. As a result, the present invention enables to improve the I/O performance of the system without increasing the cost of system construction, so that the cost performance of the system can be improved.

Embodiment 1

Figure 2:
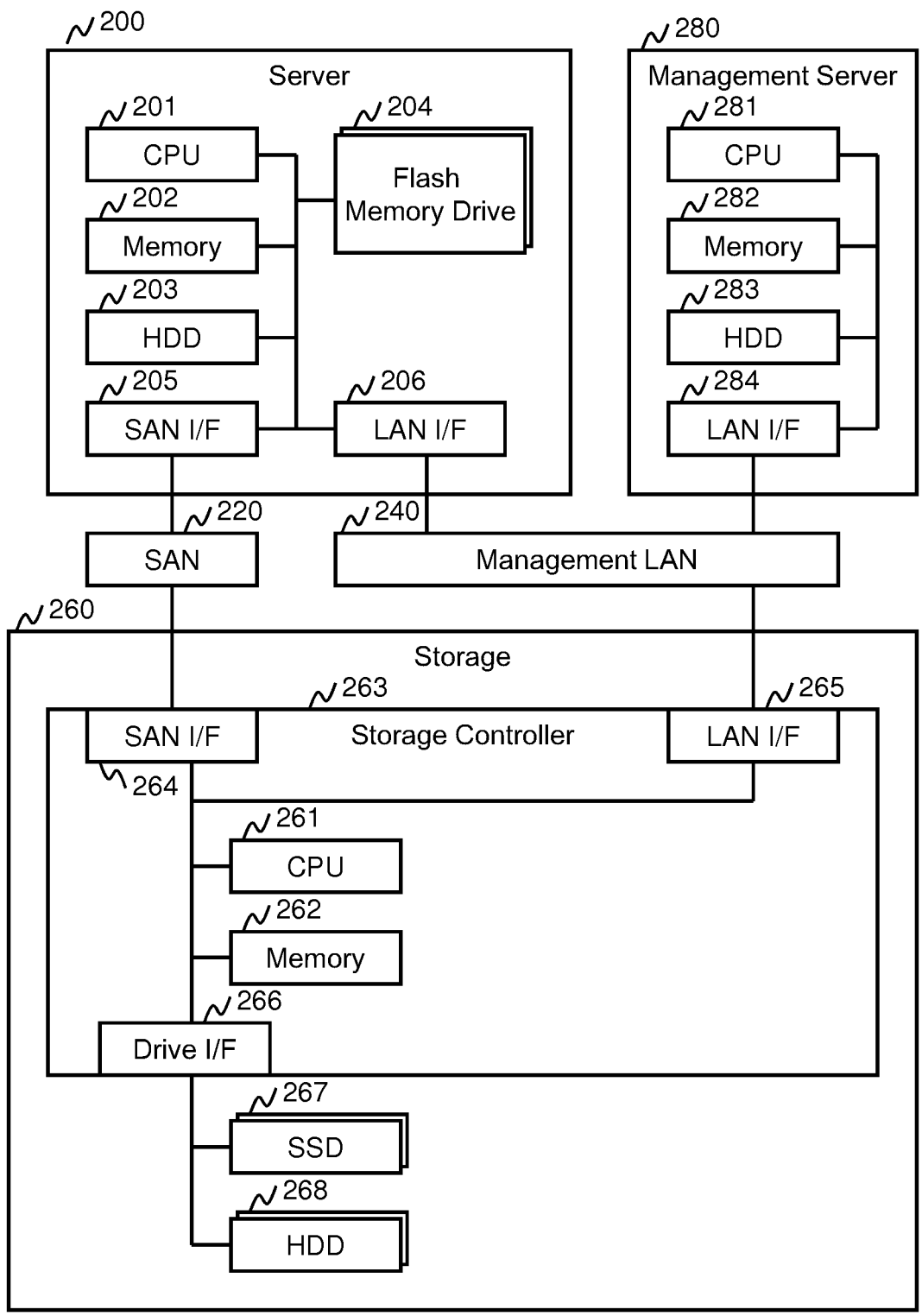
FIG. 2 shows a configuration of a computer system according to embodiment 1.

FIG. 2 illustrates a configuration of the computer system according to embodiment 1. The server 200 reads data from the storage system 260 via a SAN (Storage Area Network) 220, and writes data into the storage system 260 (sometimes abbreviate as "storage 260"). The management server 280 is connected to the server 200 and the storage system 260 via a management LAN 240 to gather information from the server 200 and the storage system 260 and to transmit instructions to the server 200 and the storage system 260.

The server 200 is composed of a CPU 201, a memory 202, an HDD 203, a flash memory drive 204, a SAN I/F 205 and a LAN I/F 206. The CPU 201 is for executing various programs used in the server 200 such as a database program described later, wherein when the server 200 is started or the like, the CPU loads the programs and data stored in the HDD 203 to the memory 202 and executes the programs to realize predetermined functions. In the present specification, there are descriptions where the "program" is described as the subject of the operation for executing a process, but actually, the processes or functions described in the present specification is realized by a program execution unit such as the CPU 201 executing the programs.

The flash memory drive 204 is used for caching the data used frequently in the server 200, and in the following specification, the flash memory drive 204 may be referred to as a "server cache". One or a plurality of flash memory drives 204 are provided in a single server 200. Storage media having a higher access performance than the HDD 203 or the HDD 268 used by the storage system 260 can be adopted as the flash memory drive 204. For example, an SSD connected to a hard disk drive (HDD) interface, or a flash storage connected to an interface for peripheral devices such as a PCI (Peripheral Component Interconnect) Express (Registered Trademark) and the like are used. Further, as for the storage media of the server cache, volatile storage media such as a SRAM (Static RAM) or a DRAM (Dynamic RAM) can be used, other than the nonvolatile memory such as the flash memory. It is also possible to use a portion of the area of the memory 202 as the server cache, without providing a flash memory drive 204.

The SAN I/F 205 is an interface for connecting the server 200 to the storage system 260, which is mainly used by the server 200 for reading and writing data in the volume of the storage system 260. Further, the LAN I/F 206 is used by the server 200 for sending and receiving management information to/from the management server 280.

The storage system 260 is composed of a storage controller 263, and a plurality of SSDs 267 and a plurality of HDDs 268 which are storage media for storing the data accessed by the server 200. The HDD 268 is a so-called magnetic disk device, and the SSD 267 is a storage device adopting a flash memory as the storage media having a higher access performance than the HDD 268, similar to the flash memory drive 204.

Further, the storage controller 263 is composed of a CPU 261, a memory 262, a SAN I/F 264, a LAN I/F 265, and a drive I/F 266. The CPU 261 receives a read command and a write command from the server 200, and controls the SSD 267 and the HDD 268. The memory 262 stores programs such as a drive control program used by the CPU 261 to control the SSD 267 and the HDD 268, and various control information, wherein various processes are performed by the CPU 261 by executing programs in the memory 262. The SAN I/F 264 is an interface for realizing communication (data input and output) between the storage system 260 and the server 200, and the LAN I/F 265 is an interface used by the storage system 260 to send and receive management information to/from the management server 280. Furthermore, the drive I/F 266 is an interface for connecting the SSD 267 or the HDD 268 with the storage controller 263. In the following description, the SSD 267 and the HDD 268 may be referred to as a "disk" or a "drive".

The storage system 260 according to the present embodiment defines the following configuration for managing storage areas. At first, RAID groups, each of which is composed of a plurality of (for example, four) disks (SSDs 267 or HDDs 268), are defined. The storage system 260 adopts a so-called RAID (Redundant Arrays of Inexpensive Disks or Redundant Arrays of Independent Disks) technique to make data redundant in preparation of disk failure and to store data in multiple disks in a distributed manner, wherein a RAID group is composed of a set of disks in which the data is stored in a distributed manner. According to the present embodiment, only one type of disk is included in a single RAID group. For example, the first RAID group is a RAID group that utilizes only the SSD 267, and the second RAID group is a group that utilizes only the HDD 268 (such as a SAS (Serial Attached SCSI) HDD). Further, the RAID group is divided into one or a plurality of consecutive areas, and the storage system 260 manages the divided consecutive areas respectively as logical volumes.

The RAID group and the logical volume are internally used management units for managing the storage areas by the storage system 260, and they are not recognized from the outside (such as from the server 200). The storage system 260 defines virtual volumes as storage media (volumes) used by the server 200 for reading and writing data, and provides them to the server 200.

A virtual volume according to the present embodiment is a volume formed by a so-called thin provisioning technique, wherein when the storage system 260 defines (creates) a virtual volume, the server 200 recognizes that virtual volume as a disk volume having a predetermined size (storage area). However, in the initial state, no specific storage area is allocated to the virtual volume. The storage system 260 manages the address space of the virtual volume in multiple fixed size (for example, 10 MB) units, and the storage area having this fixed size is called a "page" in the present specification. In other words, the respective virtual volumes are composed of a plurality of pages. The storage system 260 allocates storage areas to the respective pages. Specifically, when a write request to the virtual volume has been received from the server 200, the storage system 260 confirms whether or not a storage area is allocated to the page corresponding to the write location (LBA: Logical Block Address) designated by the write request, and if no storage area is allocated to the page, an unused area within the logical volume is allocated to that page, and data (write data) is written to the allocated storage area. The actual specific embodiment of a thin provisioning technique is disclosed for example in the specifications of US Patent Application Publication No. 2011/0208940 and US Patent Application Publication No. 2010/0205390, which are hereby incorporated by reference into the present specification.

The management server 280 is composed of a CPU 281, a memory 282, an HDD 283, and a LAN I/F 284. The CPU 281 is for executing various programs (mentioned later) operated in the management server 280, wherein the CPU loads various programs and data stored in the HDD 283 to the memory 282, and executes the programs. The LAN I/F 284 is an interface for connecting the management server 280 to a management LAN 240, which is used for communicating with the server 200 and the storage system 260.

Figure 3:
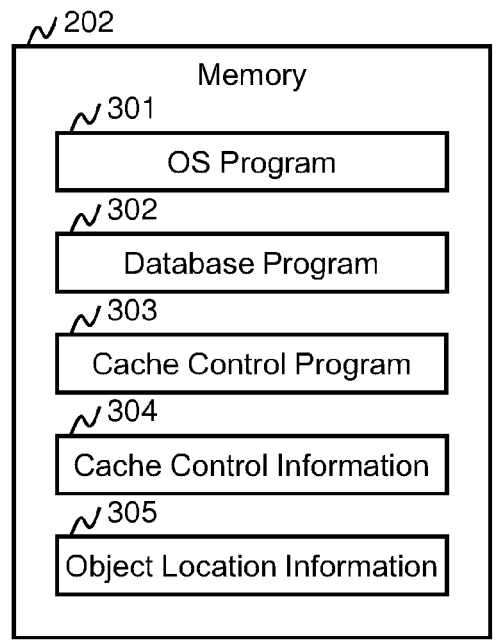
FIG. 3 shows data stored in a memory 202 of a server 200.

Next, with reference to FIG. 3, the contents of the data stored in the memory 202 of the server 200 will be described. An OS program 301 is a program for executing the database program 302. The database program 302 is an example of an application program, which performs processes such as reading data from the storage system 260, performing calculation and other processes, and writing the process results to the storage system 260. The cache control program 303 is a program for caching the data that the server has read from or written to the storage system 260 in the flash memory drive 204, so that when the server 200 attempts to read the same data again, the same data is read from the flash memory drive 204 and not from the storage system 260. The cache control information 304 is information for managing the area of the flash memory drive 204 where cached data is stored. An object location information 305 is information used in <modified example 1> described later, so that the contents thereof will be described in the description of <modified example 1>.

Figure 4:
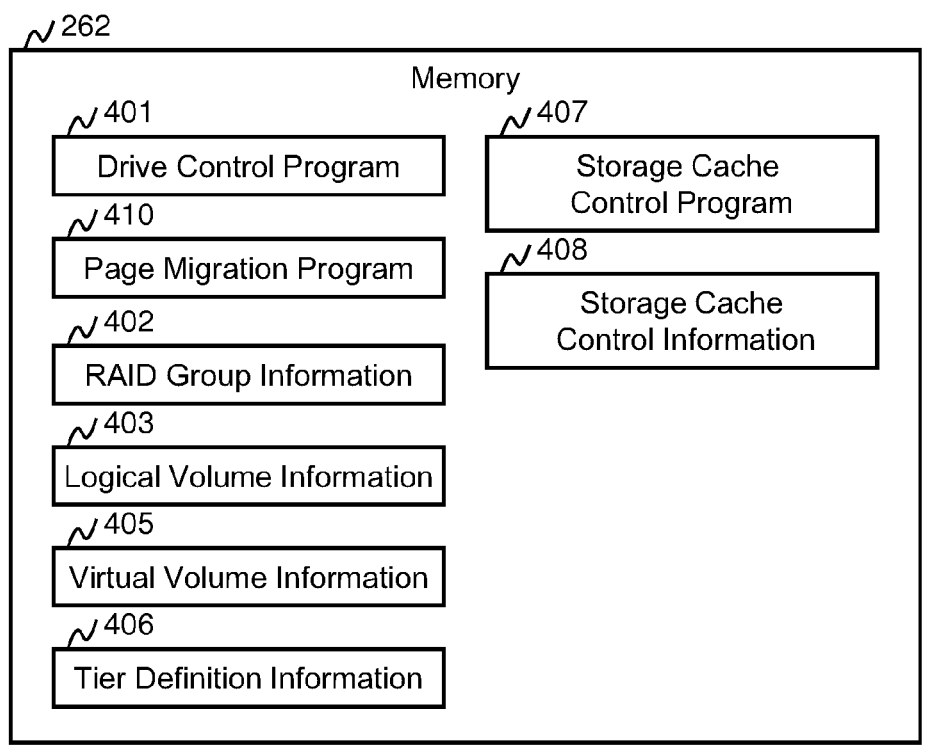
FIG. 4 shows data stored in a memory 262 of a storage system 260.

FIG. 4 shows the contents of data stored in the memory 262 of the storage system 260. A device control program 401 is a program for receiving read or write requests (commands) targeting to the virtual volumes from the server 200, and reading/writing data from/to the SSD 267 or the HDD 268 using a RAID group information 402, a logical volume information 403, a virtual volume information 405, and a tier definition information 406. The page migration program 410 is a program for changing the storage area allocated to a page (for example, changing the allocation of the page to which the storage area in the SSD 267 was allocated so that storage area in the HDD 268 will be allocated to the page), and along therewith, move the data stored in the storage area having been allocated to the page prior to the change to the storage area after the change. The RAID group information 402 is information for managing the configuration of a RAID group composed of the SSD 267 or the HDD 268. The logical volume information 403 is information for associating the logical volumes with the RAID groups. The virtual volume information 405 is information for managing the correspondence between the pages of the virtual volume with the areas in the logical volume. The tier definition information 406 is information for associating the tiers with the drive types. A storage cache control program 407 and a storage cache control information 408 are information used in <modified example 3> described in detail later, so that the contents thereof will be described in the description of the <modified example 3>.

Figures 5, 6:
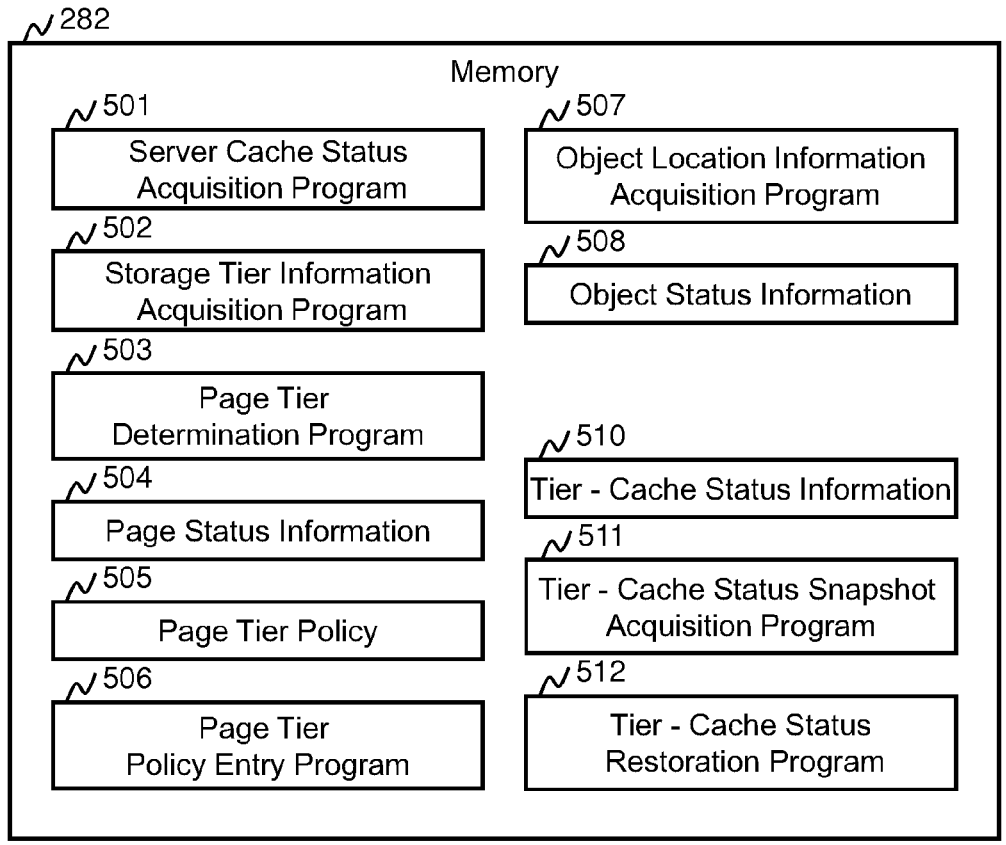
FIG. 5 shows data stored in a memory 282 of a management server 280.
FIG. 6 shows a cache control information 304.

FIG. 5 illustrates the contents of data stored in the memory 282 of the management server 280. A server cache status acquisition program 501 is a program for acquiring the cache control information 304 from the server 200. A storage tier information acquisition program 502 is a program for acquiring the virtual volume information 405 from the storage system 260. A page tier determination program 503 is a program for executing a process for determining a storage tier of the storage area to be allocated to each page of the virtual volume. A page status information 504 is information showing the status of each page. A page tier policy 505 is information used for determining the tier to which a page is to be allocated. A page tier policy entry program 506 is a program providing a GUI (Graphical User Interface) for a user or an administrator to set up the page tier policy 505.

An object location information acquisition program 507, an object status information 508, a tier-cache status information 510, a tier-cache status snapshot acquisition program 511, and a tier-cache status restoration program 512 are information used in <modified example 1> and <modified example 4> described later, so that the contents thereof will be described in detail with reference to <modified example 1>.

Next, the contents of the cache control information managed by the server 200 will be described with reference to FIG. 6. In the present embodiment, the flash memory drive 204 of the server 200 is recognized by the cache control program 303 as a single or a plurality of volumes (disk devices) by the function of the OS program 301, and the reading or writing of data from/to the flash memory drive 204 can be realized by performing similar processes as reading or writing of data from/to the disk device such as the HDD 203. In the following description, the volume composed of the flash memory drive 204 is referred to as a "cache destination volume". When the server 200 performs data access (read) to the volume (virtual volume) in the storage system 260, the server refers to the cache control information 304, and confirms whether the access target data is stored in the flash memory drive 204, that is, the cache destination volume. If access target data is not stored in the cache destination volume, the server 200 accesses the storage system 260 and reads data from the virtual volume. Thereafter, the read data is stored (cached) in the cache destination volume, and a volume name (cache source volume name) of the volume from which data has been read (virtual volume), a location information from which the data has been read (start address) and the length thereof, and a volume name and a storage location (start address) of the cache destination volume which is a storage destination of the read data, are recorded in the cache control information 304. Further according to the present embodiment, when writing data to the storage system 260, the server 202 performs the write operation under a so-called write-through mode. That is, the server 200 reports write completion to a program or the like which issued the write request when the data has been correctly written to the storage system 260. When the write-through mode is adopted, the server cache will not contribute to the increase in speed of the write processing, but when write data is stored in the cache after write operation, if a write request of the write data is received from the server 200 thereafter, the access speed will be advantageously increased. Therefore, when the server 200 performs data write to the volume (virtual volume) of the storage system 260, at first, the write target data is prepared in the memory 202, and thereafter, the data in the memory 202 is written to the volume of the storage system 260. After the writing of data to the storage system 260 has been completed, the cache control program 303 stores the same data as the data written to the storage system 260 from the memory 202 to the flash memory drive 204, and at the same time, records to the cache control information 304 the volume name of the volume (virtual volume) to which data has been written (cache source volume name), the location information in the virtual volume to which data has been written (start address) and the length thereof, and the volume name and the storage location (start address) in the cache destination volume.

Each row of the cache control information 304 shows that the data stored in the area of the virtual volume of the storage system 260 specified by a cache source volume name 601, a start address 602 and a length 603 is cached in the area of the flash memory drive 204 designated by a cache destination volume name 604 and a start address 605. A last accessed time 606 shows the time when the area of the storage system 260 specified by the cache source volume name 601, the start address 602 and the length 603 or the area of the flash memory drive 204 specified by the cache destination volume name 604 and the start address 605 was last accessed. Now, according to the present embodiment, the start addresses 602 and 605 are represented as LBAs (Logical Block Addresses), and the unit of the length 603 is the number of blocks (one block has a length of 512 bytes, for example), but the start addresses 602 and 605 or the length 603 can be represented using other units, such as bytes, for example.

Next, we will describe the information managed by the storage system 260 with reference to FIGS. 7 through 10.

FIG. 7 illustrates the contents of the RAID group information 402. Each row of the RAID group information 402 illustrates the information of the RAID group composed within the storage system 260. In the storage system 260, a unique name (identification information) within the storage system 260 is assigned to each RAID group being composed therein, and each disk (such as the HDD 268 and the SSD 267) constituting the RAID group is also given a unique name and managed therein, wherein the name of the RAID group is stored in a RAID group name 801. A name of the drive (such as the HDD 268 and the SSD 267) constituting the RAID group is stored in a drive name 802. A RAID level showing the method of redundancy of the RAID group is stored in a RAID level 803. A type of the drive (each drive shown in the drive name 802) constituting the RAID group, such as SSD, SAS HDD and so on, is stored in a drive type 804. A capacity capable of being used by the RAID group is shown in a capacity 805.

FIG. 8 shows the contents of the logical volume information 403. Each row of the logical volume information 403 shows the size of each logical volume defined in the storage system 260, and the location of each logical volume within the RAID group. Similar to the RAID group, a unique name is assigned to each logical volume for management in the storage system 260, and the name of the logical volume is stored in a logical volume name 901. A length (number of blocks) of the logical volume is stored in a length 902. A name of the RAID group to which the logical volume is allocated is shown in a RAID group name 903, and a location of the head block of the logical volume within the RAID group is shown in a start address 904, which indicates that the logical volume is located across a range of length 902 from the location specified by the start address 904 of the RAID group specified by the RAID group name 903.

FIG. 9 shows the contents of the virtual volume information 405. As described earlier, at the point of time when an access first occurs from the server 200 to the area of the virtual volume, the storage system 260 according to the present embodiment allocates an unused area having a fixed size within the logical volume to the page corresponding to the location designated by the access request. In the present embodiment, the page size is 10 MB. Further, a unique ID within the storage system 260 is assigned to each page and managed, and the ID is referred to as a "page ID".

Each row of the virtual volume information 405 includes a page ID 1101 of the virtual volume, a virtual volume name 1102, a start address 1103, a logical volume name 1104, a start address 1105, a number of reads 1106, and a number of writes 1107. The page ID 1101 shows the page ID of the page corresponding to the area within the virtual volume specified by the virtual volume name 1102 and the start address 1103. The logical volume name 1104 and the start address 1105 shows which area within which logical volume is allocated to that page. In the present embodiment, the units of the start addresses 1103 and 1105 are megabytes (MB), but other units (such as pages or blocks) can be used. In the present embodiment, the size of each page has a fixed length (10 MB), so that the area of the logical volume allocated to each page is also 10 MB. Since the page size is 10 MB, the multiple values of 10 MB is stored in the fields of the start addresses 1103 and 1105.

Further, the storage system 206 counts and records the number of read and write accesses from the server 200 within a predetermined period of time in each page. A number of reads 1106 shows the number of read accesses to a page within a predetermined period of time. A number of writes 1107 shows the number of write accesses to the page within a predetermined period of time. In the fields of the number of reads 1106 and the number of writes 1107, 0 is stored as the initial value, and each time a read command or a write command to the page is received, the storage system 206 counts up the number of the read accesses 1106 or the write accesses 1107 corresponding to that page. When a predetermined period of time has elapsed, the number of counts of the read accesses 1106 and the write accesses 1107 are all reset to 0.

In the present embodiment, when the access has been received for the first time to the area of the virtual volume from the server 200, the row of the page ID corresponding to the location designated by an access request is defined and the row is added to the virtual volume information 405. At that time, an unused area within the logical volume is selected, and the information of the area within the logical volume being selected is stored in the fields of a logical volume name 1104 and a start address 1105. There are many methods for selecting the logical volume area to be allocated when an access first occurs to the area of the virtual volume from the server 200. For example, it is possible to adopt a method of selecting an unused area from the logical volume composed of the SSD 267 having the highest level of performance preferentially, or of selecting an unused area from the logical volume composed of the storage media having the lowest level of performance preferentially.

As another embodiment, it is possible to allocate unused areas of the logical volume to all pages of the virtual volume when the virtual volume is defined, and to store the information of all pages of the virtual volume to the virtual volume information 405.

FIG. 10 illustrates the contents of the tier definition information 406. As described earlier, the storage system 206 according to the present embodiment equips two types of drives, which are HDD 268 and SSD 267 having higher access performance than HDD 268. Further, there are two types of drives in HDDs 268, which are SDD (Serial Attached SCSI) HDD and SATA (Serial ATA) having a lower access performance than SAS HDD. Thus, a total of three drives can be equipped in the storage system 206. The storage system 206 manages each of the storage area of the RAID group or the logical volume composed of the SSD 267, the storage area of the RAID group or the logical volume composed of the SAS HDD, and the storage area of the RAID group or the logical volume composed of the SATA HDD as storage areas of different storage tiers. In the tier definition information 406 of FIG. 10, a tier 1201 shows the tier to which the storage area composed of the type of the drive stored in the field of the drive type 1202 belongs to. Thus, the storage system 260 can determine that the storage area of the RAID group or the logical volume composed of the SSD 267 is a storage area belonging to tier 1, the storage area of the RAID group or the logical volume composed of the SAS HDD is a storage area belonging to tier 2, and the storage area of the RAID group or the logical volume composed of the SATA HDD is a storage area belonging to tier 3. In the present embodiment, the tier having a smaller tier number shown in the tier 1201 of the tier definition information 406 of FIG. 10 is referred to as a storage area of an "upper-level tier", and the storage area of an upper-level tier has a higher access performance than the storage area of the lower-level tier. Further, the storage tier having a larger tier number is referred to as a storage area of a "lower-level tier".

Figures 11, 12:
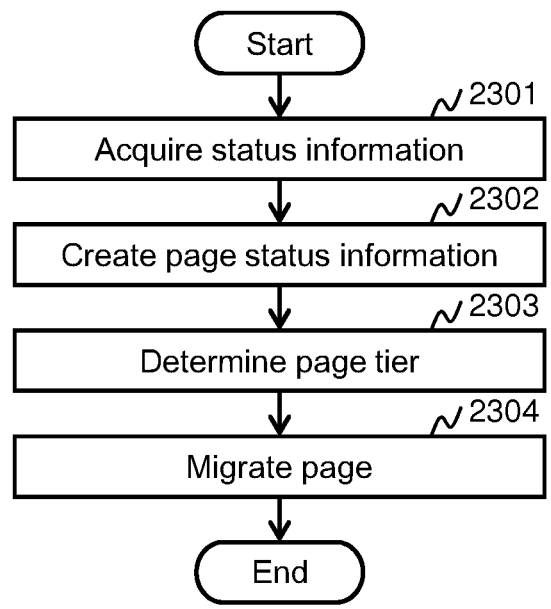
FIG. 11 shows a flow of changing page tiers based on a server cache status and a read rate.
FIG. 12 shows a page status information 504.

Next, with reference to FIG. 11, the process for changing the storage tier storing the data in the virtual volume by the storage system 260 according to embodiment 1 of the present invention will be described. According to the present embodiment 1, the management server 280 executes this process periodically, such as in a periodic cycle of once an hour or once a day, for example.

Before describing the process of FIG. 11, the term "page migration" used in the present embodiment will be described. As mentioned above, the page according to the present embodiment has an area of the logical volume allocated thereto. The logical volume is a storage area of tier 1, tier 2 or tier 3, so that it can be said that each page has a storage area of either tier 1, tier 2 or tier 3 allocated thereto.

In the present invention, "page migration" refers to changing a storage area allocated to a page to another storage area which is different from the currently allocated storage area. For example, when it is described that a "page is migrated to tier 2", it means that if an area of tier 1 or tier 3 is allocated to the page currently, the allocation is changed so that an area of tier 2 is allocated thereto. When the storage area allocated to the page is changed, a process is also performed to move the data stored in the currently allocated storage area to the storage area after the change. Thereby, the storage tier to which the data within the page is changed, that is, the storage location, is changed, but that upper-level server 200 will not recognize the change of storage location of data, so that the data migration among storage tiers is performed transparently. In the following description, where the term "page migration" is used, it means that the above-described process is performed. Also, instead of expressing that a page is migrated to a different storage tier, it is also possible to adopt the expression that the data of a page is migrated to a different storage tier since the data is also moved when page migration processing is performed. The details of page migration are disclosed for example in the specification of US Patent Application Publication No. 2013/0036250, the contents of which are hereby incorporated by reference into the present specification.

Now, the processes of FIG. 11 will be described. In step 2301, the server cache status acquisition program 501 acquires the cache control information 304 from the server 200, and the storage tier information acquisition program 502 acquires the virtual volume information 405 from the storage system 260. In step 2302, the page tier determination program 503 creates the page status information 504 (FIG. 12).

The content of the page status information 504 will be described with reference to FIG. 12. Each row of the page status information 504 stores a page ID 1501, a read rate 1502 and a server cache rate 1503 for each page stored in the page ID 1101 of the virtual volume information 405.

The read rate 1502 is information showing the ratio of the number of reads to the total number of I/Os regarding that page, and in the present embodiment, the value thereof is calculated based on the number of reads 1106 and the number of writes 1107 stored in the virtual volume information 405. Specifically, the value calculated by dividing the number of reads 1106 by the sum of the number of reads 1106 and the number of writes 1107 is set as the read rate 1502. For example, with reference to FIG. 9, regarding page 0 stored in row 1108 of the virtual volume information 405, since the number of reads 1106 is 95 and the number of writes 1107 is 5, in the row (row 1504) where the information of page 0 is stored in the page status information 504 of FIG. 15, the read rate 1502 is 95/(95+5)=0.95 (95%).

The server cache rate 1503 is a value calculated for each page of the virtual volume, similar to the read rate 1502. Actually, the value represents the ratio of the amount of data being cached in the server cache (flash memory drive 204) with respect to the page size, which is calculated using the virtual volume information 405 and the cache control information 304. Since the cache control information 304 includes information related to the area storing the original data of the data cached in the server cache (cache source volume name 601, start address 602 and length 603), so that by utilizing this information, the virtual volume page ID 1101, the virtual volume name 1102 and the start address 1103 of the virtual volume information 405, it becomes possible to calculate the amount of data cached in the server cache in each page. By dividing this value by the page size, the server cache rate 1503 can be calculated. For example, if there is a page in which the amount of data cached in the server cache is 9 MB, since the page size is 10 MB in the embodiment of the present invention, the cache rate 1503 will be 9/10=0.9 (90%). The page tier determination program 503 calculates the read rate 1502 and the server cache rate 1503 for each page, and stores them in the page status information 504.

In step 2303, the page tier determination program 503 determines the storage tier to which each page should be placed (migrated) based on the page tier policy 505 and the page status information 504 calculated in step 2302.

The page tier policy 505 will be described with reference to FIG. 13. According to the computer system of the present embodiment, the computer system determines whether the read rate 1502 and the server cache rate 1503 satisfy a given condition or not in each page, and determines to place (migrate) the data of the page which was determined to satisfy the given condition to a predetermined tier. The page tier policy 505 stores this condition, and includes fields of a read rate condition 1601, a server cache rate condition 1602, and a tier 1603. Each row represents the condition (policy) of the page allocation. For example, row 1604 of FIG. 13 represents a policy in which the page satisfying a condition in which the read rate condition 1601 is 90% or higher and the server cache rate condition 1602 is 70% or higher is migrated to a tier designated in the tier 1603 (tier 2, or to a storage tier composed of SAS HDD based on the tier definition information 406 of FIG. 10, for example).

In FIG. 13, the reason of having the policy of rows 1604 and 1605 defined is as follows. If much of the data within the page is cached in the server cache and the tendency of access of that data is mainly a read access, the server 200 accesses the data in the server cache and often will not access the storage system 260, so that there is little need to place the data of that page onto the storage area of an upper-level tier. Therefore, if a policy to migrate the data having a high read rate to a lower-level tier is adopted, other data can be placed onto the upper-level tier, thereby the server cache and the SSD 267 can be effectively utilized. Further, if the page has a high write access frequency, the access performance will not be improved even if data is stored in the server cache during write access, so that it is preferable to place such data onto a higher-level storage tier in the storage system 260. Therefore, the policy in row 1605 is defined.

Moreover, the respective conditions of the page tier policy 505 is set by the administrator of the computer system entering conditions using the management server 280 via a GUI provided by the page tier policy entry program 506 of the management server 280 (in other words, the conditions are stored in the page tier policy 505). FIG. 14 illustrates one example of a page tier policy entry screen 5060. The administrator of the computer system enters the items in a read rate 1701, a server cache rate 1702 and a tier 1703, and clicks a button 1707 after entering all items, based on which the page tier policy entry program 506 reflects the contents in the page tier policy 505.

In step 2304, the page tier determination program 503 transmits an instruction to place (migrate) the page to a tier determined in step 2303 to the page migration program 410 of the storage system 260. The page migration program 410 determines based on the virtual volume information 405, the logical volume information 403 and the tier definition information 406 whether the storage tier of the storage area allocated to each page corresponds to the information of the storage tier being instructed by the page tier determination program 503. If the storage tiers correspond, there is no need to migrate the page so that no operation is performed, but if the storage tiers do not correspond, the page must be migrated to the tier instructed by the page tier determination program 503. Simultaneously as the page migration, the virtual volume information 405 is updated. When page migration processing is completed for all pages, the process is ended.

As for the page that does not correspond to any conditions stored in the page tier policy 505, page migration will not be performed. In another example, it is possible to execute page migration based on a policy of a well-known hierarchical storage management function, such as migrating a page having a high I/O frequency to a high-speed upper-level tier, and migrating a page having a low I/O frequency to a low-speed lower-level tier.

Regarding embodiment 1, out of the data cached in the server, the data having a high read access has a storage area of a low-speed lower-level tier allocated thereto, so that the storage of data in a duplicated manner both in the server cache and an upper-level tier (SSD) of a storage system can be prevented, based on which a greater amount of data can be allocated to a high-speed storage media and the I/O performance can be improved. As for the write processing, since write processing is executed in write-through mode in the server, the cache in the server will not function effectively, but by setting the page tier policy 505, the data having both read access and write access exist out of the cached data can be placed onto a high-speed storage tier of the storage system 260, so that the deterioration of performance of write processing can be prevented.

Modified Example 1

According to embodiment 1 described above, the storage tiers are controlled (changed) in units of pages managed by the storage system 260, but for example, the storage tiers can also be controlled in units of objects or portions of the objects managed by the application program, such as the database program 302, which can be a database table or an index. The present embodiment describes the information managed by the computer system according to such example. FIG. 15 shows the object location information 305 created by the database program 302. The area specified by an object name 701, a start address 703 and a length 704 of each row shows the area of an object used in the database program 302. Incidentally, the objects specified by the object name 701 are all objects managed by the database program 302 by storing them in the volume(s) of the storage system 260. An object type 702 shows the type of the objects. The area of the object shows that the object is placed onto an area in the storage system 260 specified by a volume name (virtual volume name) 705 and a start address 706 in the same row. Further, in FIG. 15, the information of the object referred to as table A is stored in multiple rows (row 709 and row 710), but this means that the object referred to as table A is composed of two areas defined in rows 709 and 710. A read rate 707 is information showing the ratio of the number of reads with respect to the total number of I/Os (number of reads+number of writes) to the area specified by the object name 701, the start address 703 and the length 704, and a cache rate 708 is information showing the percentage of the area specified by the object name 701, the start address 703 and the length 704 cached in the server cache, which are created by referring to the cache control information 304. These information are constantly maintained and managed by the database program 302.

Next, we will describe a method for changing a storage tier in object units. The object location information acquisition program 507 of the management server 280 acquires the object location information 305 and the virtual volume information 405, and based on the object location information 305 and the virtual volume information 405, computes a read rate and a cache rate of each object, and creates the object status information 508. The contents of the object status information 508 are illustrated in FIG. 16. An object name 1801 shows the object name. A read rate 1802 shows the ratio of the number of reads with respect to the total number of I/Os of that object. A server cache rate 1803 shows the rate of the area cached to the server out of the areas of that object.

Now, the read rate 1802 is calculated based on the following method. At first, the object location information 305 is used to specify the location (specified by a volume name 705, a start address 706 and a length 704) of the area where a certain object is stored, and thereafter, based on the virtual volume information 405, specifies to which page (one page or multiple pages) of the virtual volume the specified area is placed. Next, the number of reads 1106 of each specified page is added together, and the total number of reads that has occurred to that object is acquired. Similarly, the number of writes 1107 of each specified page is added together, and the total number of writes that has occurred to that object is acquired. The read rate is calculated based on the total number of reads and the total number of writes of that object, and the value is stored in a read rate 1802. The read rate is computed by "total number of reads/(total number of reads+total number of writes)". If an object is allocated to only a portion of the page, the above-mentioned process is executed based on a rule assuming that the object is allocated to the whole page even if the object is allocated to a portion of the page based on a rule set in advance. Further, a server cache rate 1803 is calculated based on the following method. Regarding the area defined by each row of the object location information 305, the product of the length 704 and the cache rate 708 is calculated, so that the amount of data cached in the server cache with respect to this area can be calculated. Then, by calculating the total amount of data being cached regarding each area of the object, the amount of cached data of the object can be calculated. Next, by calculating the sum of the length 704 regarding the respective areas of the object, the object size can be calculated. Then, by dividing the amount of cached data by the object size, the cache rate of the object can be calculated.

After determining the tier of each object based on the object tier policy, the respective objects are migrated. In the present embodiment, the object tier policy has conditions similar to the page tier policy 505 defined, wherein a policy is defined to migrate an object satisfying a given read rate condition and a server cache rate condition to a designated tier in object units. The actual method of migration can be, for example, the method disclosed in US Patent Application Publication No. 2011/0202705, wherein pages storing respective objects are specified based on the object location information 305, and whether a storage tier in which the specified pages currently exist is equal to the defined object tier is determined, and the page determined as not equal (determined to be allocated to a tier that differs from the determined object tier) is migrated to the determined object tier. At this time, if a state occurs in which a portion of different objects are stored in a single page, processing is performed based on a rule that is set in advance. The rule that is set in advance can be, for example, to perform page migration corresponding to an upper tier out of the two or more determined tiers. If such rule is set, if an object to be allocated to tier 1 and an object to be allocated to tier 2 are stored in the same page, that page is determined to be migrated to tier 1.

According to the example described above, the object location information 305 is collected, the read rate and the cache rate are calculated for each object, and whether migration of a storage tier is necessary or not is determined in object units, but it is possible that the judgment of the necessity of the migration between storage tiers and the execution of the migration between storage tiers can be done in units of portions of objects (the information stored in each row of the object location information 305).

Modified Example 2

According to the computer system of embodiment 1, the server cache status acquisition program 501, the storage tier information acquisition program 502 and the page tier determination program 503 are prepared in the management server 280, but it is also possible to provide them for the storage system 260 and to have the storage system 260 acquire the cache control information 304 directly from the server 200 to determine whether page migration is necessary or not. In that case, the process of FIG. 11 can be set to be executed each time when an update of the cache control information 304 occurs (such as when the server 200 accesses the virtual volume and the state of the data stored in the flash memory drive 204 which is a server-side cache is changed).

Another possible example can have the server cache status acquisition program 501, the storage tier information acquisition program 502 and the page tier determination program 503 provided for the server 200, and have the server 200 determine whether page migration is necessary or not. Further, in embodiment 1, page migration of a storage is determined based on the read rate 1502 and the server cache rate 1503, but it is also possible to determine the page tier based only on the number of writes 1107. In that case, the pages are placed onto the storage area of the upper-level tier in descending order of the number of writes 1107 to each page.

Modified Example 3

In the computer system according to embodiment 1, it is further possible to provide a function to the storage system 260 to use a portion of the area of the SSD 267 as a cache. In that case, the storage cache control program 407 and the storage cache control information 408 are stored in the memory 262 of the storage system 260. The storage cache control program 407 temporarily stores (caches) the data read from the HDD 268 based on a data read request from the server 200 or the data written into the HDD 268 based on a write request from the server 200 in the SSD 267. The storage cache control information 408 is information for managing which data is cached to which logical volume.

FIG. 17 shows the contents of the storage cache control information 408. The storage system 260 according to modified example 3 caches a portion of the area of the virtual volume to a logical volume allocated in a RAID group composed of the SSD 267. Of course, in that case, the area in the logical volume used as cache is an area not allocated to the virtual volume. The storage cache control information 408 shows that the area specified by a cache source volume name 1301, a start address 1302 and a length 1303 is cached in an area specified by a cache destination volume name 1304 and a start address 1305 of a cache destination logical volume. In the cache source volume name 1301, virtual volume name is stored, and logical volume name is stored in the cache destination volume name 1304.

According to the storage cache control program 407 of modified example 3, the minimum management unit of the cached data is a block (512 bytes), and the length 1303 stores the number of blocks. However, the amount of information managed by the storage cache control information 408 tends to increase as the unit of cached data minimizes, so that the unit of cached data can be set to units greater than blocks (such as 64 KB or to 1 MB) so as to suppress the increase of the amount of information managed by the storage cache control information 408.

A reflection 1306 shows whether the data written into the cache destination area is reflected in the cache source area or not. If "reflected", it means that the data is reflected, and if "not reflected", it means that the data is not reflected. A last accessed time 1307 shows the time that the area has been last accessed.

Figure 18:
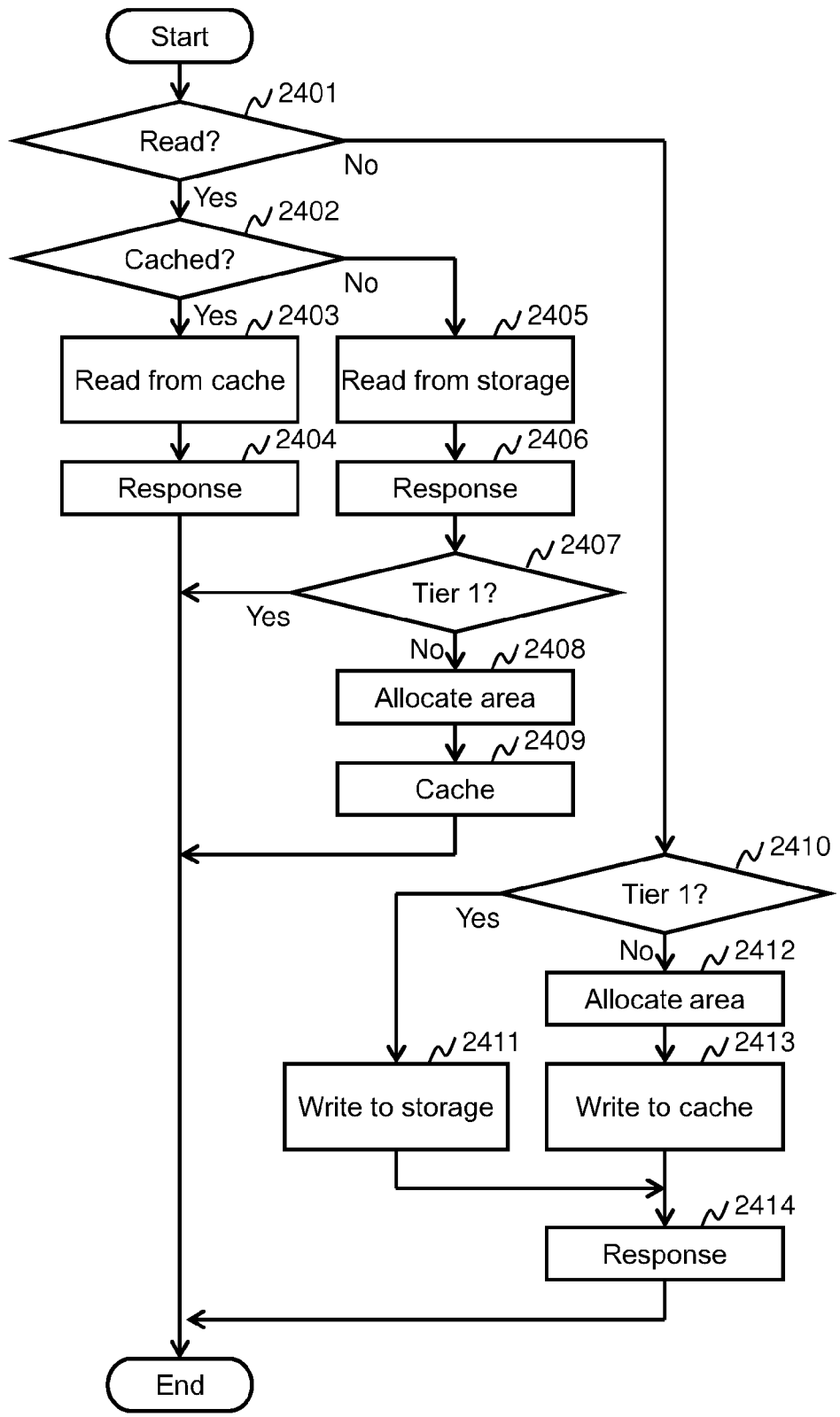
FIG. 18 shows the operation of a storage cache control program 407.

The operation of the storage cache control program 407 will be illustrated in FIG. 18. The process executed by the storage cache control program 407 is similar to the process used in a well-known cache technique, but what differs from the well-known cache technique is that the data stored in the storage area (page) is cached when the storage area (page) of the virtual volume belongs to a lower-level tier (such as tier 2), but that the data stored in the storage area is not cached when the storage area belongs to an upper-level tier (tier 1). According to the storage system 260 of embodiment 1, a portion of the area of SSD 267 is used as a so-called write back cache. That is, at the point of time when the write data being transferred to the storage system 260 is stored in the cache accompanying the write request from the server 200, a response notifying write process complete is returned to the server 200, and the writing of data from the cache to the HDD 268 is performed asynchronously as the write request from the server 200.

In determination step 2401, the storage cache control program 407 determines whether the I/O request from the server 200 is a read request or not. If the request is a read request, the procedure advances to determination step 2402, and if the request is a write request, the procedure advances to determination step 2410. In determination step 2402, the storage cache control program 407 refers to the storage cache control information 408, and determines whether the read target area is cached or not. If the data is cached, the procedure advances to step 2403, and if the data is not cached, the procedure advances to step 2405. In step 2403, the storage cache control program 407 refers to the storage cache control information 408, and reads data from the cache destination volume 1304. In step 2404, the storage cache control program 407 returns the data read in step 2403 to the server 200.

In step 2405, the drive control program 401 refers to the virtual volume information 405, the logical volume information 403 and the RAID group information 402, and reads data from the SSD 267 or the HDD 268. In step 2406, the storage cache control program 407 returns the data read in the step 2405 to the server 200. In step 2407, the storage cache control program 407 refers to the virtual volume information 405, the logical volume information 403, the RAID group information 402 and the tier definition information 406, and determines whether the area in which the data read in step 2405 has been stored is tier 1 (SSD 267) or not. If the area is tier 1, the process is ended, and if the area is not tier 1, the procedure advances to step 2408. In step 2408, an area necessary for caching the data in the SSD 267 is allocated. This process is a known technique, so detailed descriptions thereof are omitted, but the storage cache control program 407 refers to the virtual volume information 405 and the storage cache control information 408, confirms whether a free area (unused area) for caching exists in the logical volume or not, and if there is a free area, the area is allocated as a cache destination area, so that information such as a cache source volume 1301 and a cache destination volume name 1304 and the like are stored in the storage cache control information 408. If there is no free area, the storage cache control program 407 refers to the last accessed time 1307 of the storage cache control information 408, deletes an area where the last accessed time 1307 is oldest to create a free space, and utilizes that area as the cache destination area. At this time, if the reflection 1306 is set to "not reflected", data is reflected in the cache source before the area is deleted. In step 2409, the storage cache control program 407 stores the data read in step 2405 to the area allocated in step 2408.

In determination step 2410, the storage cache control program 407 refers to the virtual volume information 405, the logical volume information 403, the RAID group information 402 and the tier definition information 406, and determines whether the write destination area is tier 1. If the destination is tier 1, the procedure advances to step 2411. In step 2411, the drive control program 401 refers to the virtual volume information 405, the logical volume information 403 and the RAID group information 402, and writes data into the SSD 267. In step 2414, the storage cache control program 407 returns a report to the server 200 notifying that write operation has been completed, and ends the process. In determination step 2410, if it is determined that the write destination area is not tier 1, the procedure advances to step 2412. In step 2412, an area required to cache data is allocated, similar to step 2408. In step 2413, the storage cache control program 407 stores the data in the cache, and updates the storage cache control information 408. Thereafter, in step 2414, the storage cache control program 407 returns a report notifying that the write processing has been completed to the server 200, and ends the process. In the above description, for sake of simplified description, a process has been described of the case where the data in the area designated by the read request is either all cached or all not cached, but if the area designated by the read request includes cached portions and non-cached portions, the read processing of the cached portion can be executed by performing step 2403 and subsequent steps, and the read processing of the non-cached portion can be executed by performing step 2405 and subsequent steps.

Modified Example 4

Figure 19:
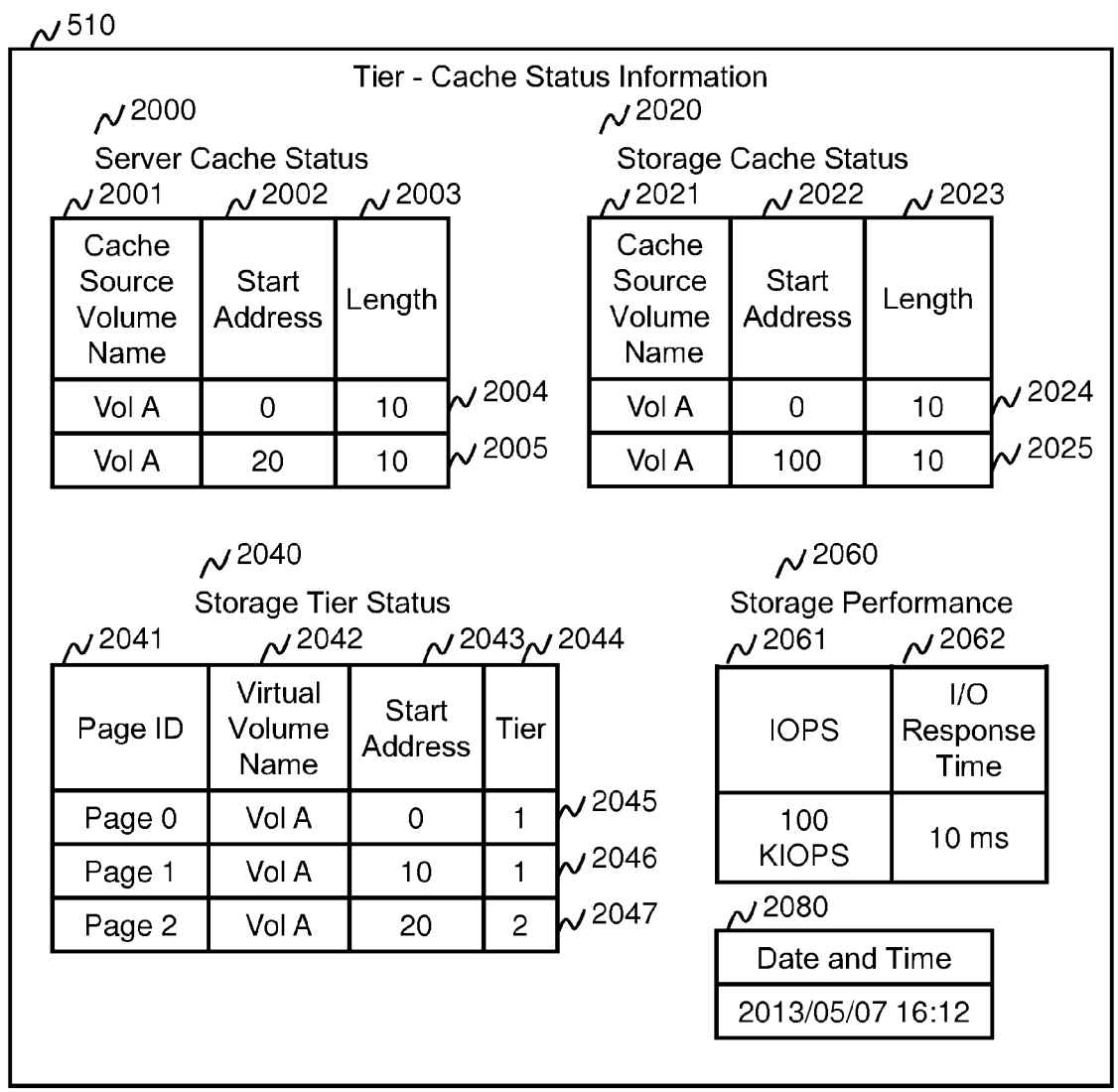
FIG. 19 shows a tier-cache status information 510.

As a modified example 4 of the computer system according to embodiment 1 of the present invention, a configuration is possible to provide a function where the information of the area cached to the server cache of the server 200 and the information cached to the cache of the storage system 260 (a portion of the area of the SSD 267) and the information related to the storage tier to which the respective pages are allocated (called a tier-cache status information) are stored as the information related to the area of the virtual volume at a specific time point, and based on this information, the storage tier and the cache status of each area of the virtual volume can be returned to the state at that specific time point. The contents of the tier-cache status information 510 will be described with reference to FIG. 19. A server cache status 2000 shows the information of the area cached to the server cache of the server 200 out of the areas in the virtual volume, and indicates that the data of the area of the virtual volume specified based on a cache source volume name 2001, a start address 2002 and a length 2003 is cached in the server. A storage cache status 2020 shows the information related to the area cached in the cache of the storage system 260 out of the areas of the virtual volume, and indicates that the data of the area of the virtual volume specified by a cache source volume name 2021, a start address 2022 and a length 2023 is cached in the cache of the storage system 260. A storage tier status 2040 shows the information related to the storage tier to which each page is allocated, and indicates that an area (page) specified by a page ID 2041, a virtual volume name 2042 and a start address 2043 is stored in the storage tier shown in tier 2044. A date and time 2080 shows the date and time in which the information of the server cache status 2000, the storage cache status 2020 and the storage tier status 2040 have been acquired. Storage performance 2060 represents the performance of the storage system 260 at the date and time 2080 (when information has been acquired), and stores an IOPS 2061 and an I/O response time 2062.

Figure 20:
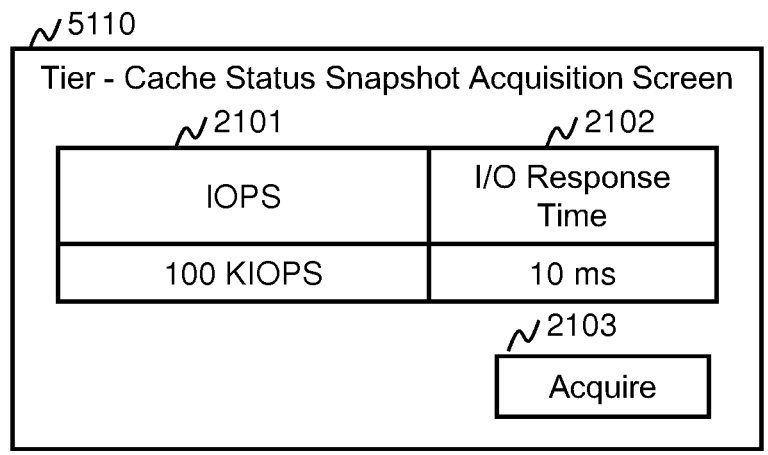
FIG. 20 shows a tier-cache status snapshot acquisition screen 5110.

FIG. 20 illustrates a tier-cache status snapshot acquisition screen 5110 provided by the tier-cache status snapshot acquisition program 511. The acquisition screen 5110 shows an TOPS of the storage system 260 at the current time point (at the time point of screen display) (IOPS 2101), and an average response time (I/O response time 2102). When the user/administrator clicks a button 2103, the management server 280 collects the status of the storage tier or the cache status at that time point from the server 200 and the storage system 260, and creates and records the tier-cache status information 510.

Figure 21:
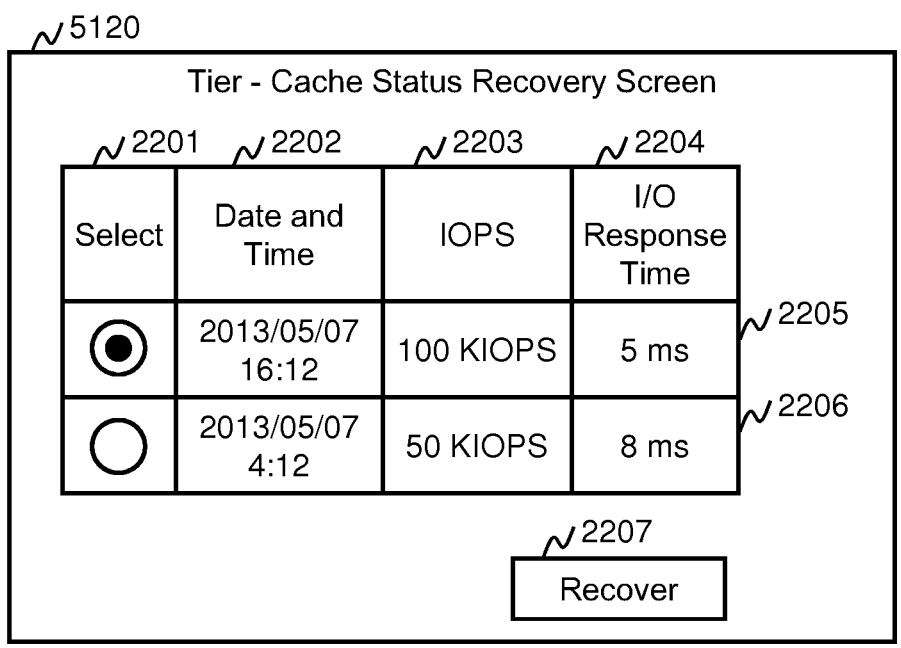
FIG. 21 shows a tier-cache status recovery screen 5120.

FIG. 21 illustrates a tier-cache status recovery screen 5120 provided by the tier-cache status restoration program 512. A date and time 2202 shows the date and time when the tier-cache status has been acquired, and an IOPS 2203 and an I/O response time 2204 show the storage performance at the time the tier-cache status has been acquired. The IOPS 2203 and the I/O response time 2204 are displayed as reference information, and it is possible to display information other than the IOPS 2203 and the I/O response time 2204 as reference information. When the user/administrator selects any one of the radio buttons in select column 2201 and clicks a button 2207, the tier-cache status restoration program 512 executes restoration of the tier-cache status at date and time 2202 in the row where the radio button has been set to selected state. Actually, the tier-cache status restoration program 512 issues an instruction to the storage system 260 and the server 200, so that the data of the volume stored in the server cache status 2000 is cached to the server cache and data stored in the storage cache status 2020 is cached in the cache of the storage system 260, wherein the storage area of the tier recorded in the storage tier status 2040 is allocated to each page of the storage system 260. Incidentally, when executing the restoration processing, if the process of FIG. 11 illustrated in embodiment 1 of the present invention, that is, a process for changing the storage tier storing the data in the virtual volume, is being executed, the process is interrupted temporarily.

According to the above example, three types of information, which are the server cache status 2000, the storage cache status 2020 and the storage tier status 2040, are acquired as the tier-cache status information 510, but it is possible to acquire only one of the above three types of information, or to acquire two of the three types of information.

According to the example of FIGS. 20 and 21, all the data cached in the server cache, and all the virtual volumes within the storage system 260, are subjected to snapshot acquisition and restoration of tier-cache status, but it is also possible to perform snapshot acquisition and restoration of the tier-cache status in volume units. In that case, the tier-cache status snapshot acquisition screen 5110 displays the IOPS and the average response time in virtual volume units, and a screen capable of enabling the administrator of the computer system to designate the virtual volume (one or multiple virtual volumes) that he/she wishes to acquire the tier-cache status snapshot thereof. Further, the tier-cache status recovery screen 5120 is also designed to provide a screen enabling the administrator to designate restoration in virtual volume units.

Modified Example 5

According to the modified example 3 described above, the capacity of the SSD 267 used as tier 1 and the capacity of the SSD 267 used as the cache can be changed during system operation. If the cache is not used, the capacity of the SSD utilized as cache is reduced so as to increase the capacity of the SSD used as tier 1. What is meant by the cache not being used is that the cache is not accessed for a given time or longer, such as if the last accessed time 1307 is longer than an hour ago. If the locality of the I/O is low and a large number of caches are deleted during execution of step 2408 of FIG. 18 (process for securing cache area), the cache capacity is insufficient, so that the capacity of the SSD used as cache is increased and the capacity of the SSD used as tier 1 is reduced. When the capacity is changed and the access rate to the SSD is increased, this operation is repeatedly performed, while on the other hand, if the access rate to the SSD is decreased, an opposite operation is performed. In another example, it is possible to provide multiple virtual volume information 405 and storage cache control information 408, and to assume a plurality of patterns of the capacity of the SSD used as cache and the capacity of the SSD used as tier 1, calculate simulated access rates to the SSD, and to change the configuration to the pattern where the access rate is most improved.

Embodiment 2

Embodiment 2 of the present invention will now be described. The computer system according to embodiment 2 of the present invention has a similar configuration as the computer system according to embodiment 1, so that only the points that differ from embodiment 1 will be described herein. In the system described in embodiment 1, the page placement (storage tier) within the storage system 260 is controlled so as to prevent data from being stored in a duplicated manner in the server cache and the upper-level storage tier of the storage system, but according to the system of embodiment 2, the server 200 controls the server cache so as to prevent data from being stored in a duplicated manner in the server cache and the upper-level storage tier of the storage system.

Figure 22:
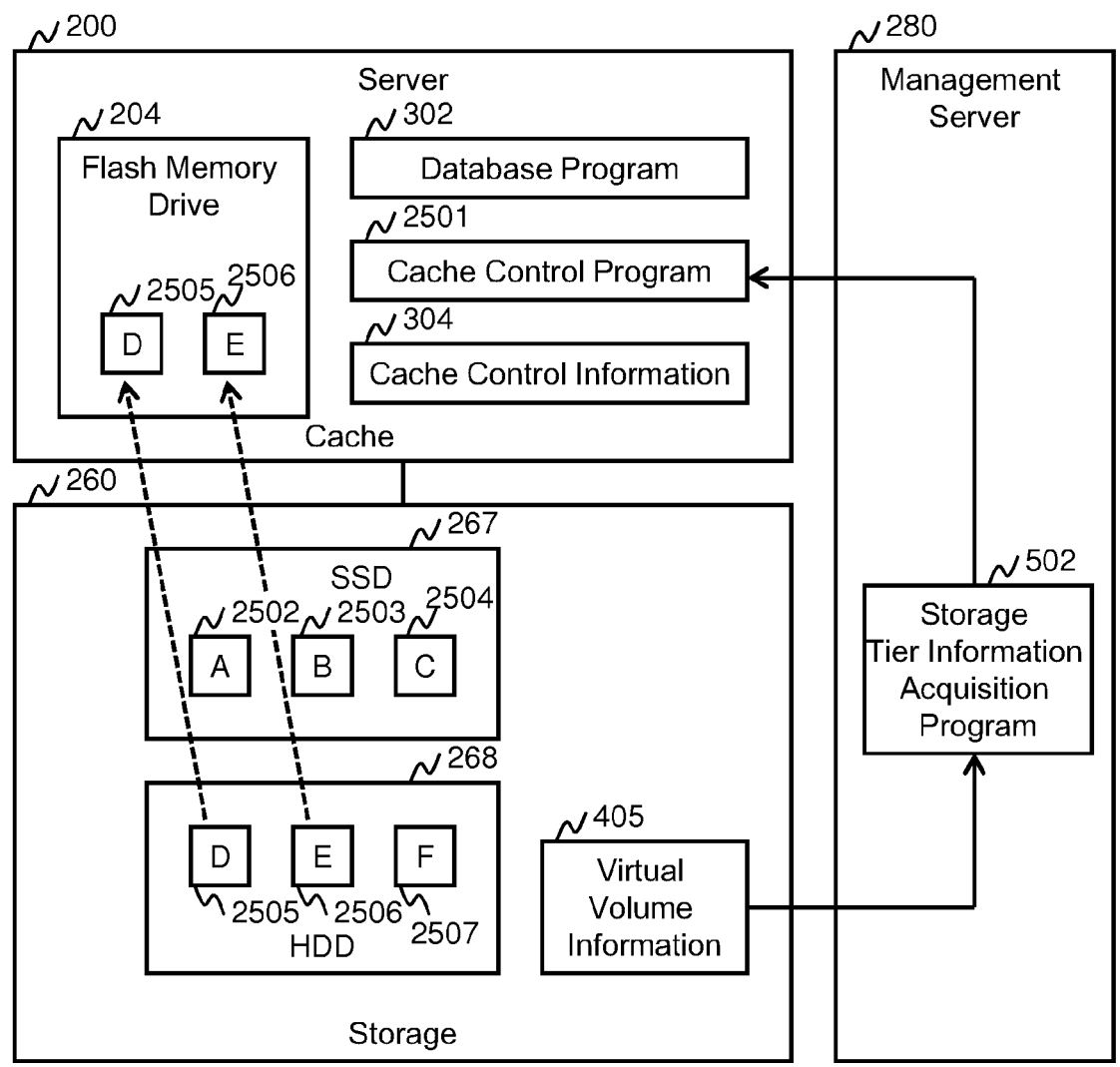
FIG. 22 shows an outline of embodiment 2.

FIG. 22 shows the outline of embodiment 2. Information related to the tier to which the respective data is stored, such as data A 2502 being placed onto tier 1 and data D 2505 being placed onto tier 2 (which is referred to as page tier information) is notified from the management server 280 to a cache control program 2501 of the server 200. The cache control program 2501 will not cache the data placed onto tier 1, and caches the data placed onto tier 2 to the flash memory drive 204. The timing of acquiring the information regarding the tier to which the respective data is placed is when the storage system 260 performs a process to migrate the data having a large number of I/Os to a high-speed tier and to migrate the data having a small number of I/Os to a low-speed tier in accordance with the method disclosed in US Patent Application Publication No. 2013/0036250. According to a different method, it is possible to periodically acquire the information related to the tier to which the respective data is allocated, such as once an hour.

FIG. 23 shows the contents of a page tier information 520. The page tier information 520 includes the following items: a volume name 5021, a start address 5022, an end address 5023 and a tier 5024, which is the information showing that the area specified by the volume name 5021, the start address 5022 and the end address 5023 exists within the storage area of the tier specified by the tier 5024. The volume name 5021 is the name of the volume (virtual volume) provided to the server 200 from the storage system 260, and the unit of the start address 5022 and the end address 5023 is LBA. The management server 280 acquires from the storage system 260 the virtual volume information 405, the tier definition information 406, the RAID group information 402 and the logical volume information 403, determines the tier from which the storage area is allocated to each page, creates the page tier information by converting the page ID to an address such as the LBA so as to enable the server 200 to recognize the location of each area, and provides the information to the server 200.

Figure 24:
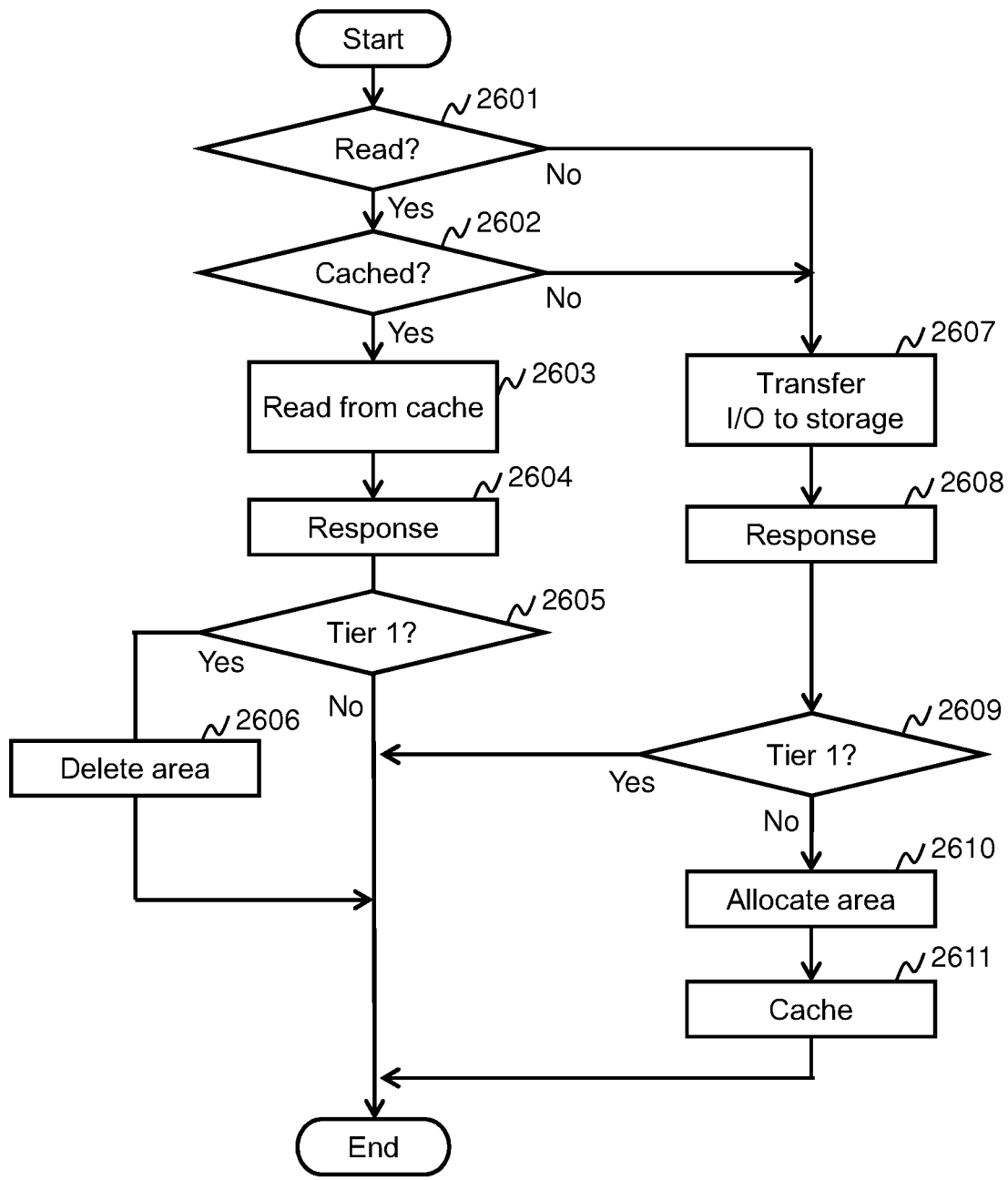
FIG. 24 shows a view showing a flow of operation of a cache control program 2501 according to embodiment 2.

FIG. 24 is a view showing the flow of the operation of the cache control program 2501 according to embodiment 2. In determination step 2601, the cache control program 2501 determines whether the I/O request from the database program 302 is a read request or not. If the request is a read request, the procedure advances to determination step 2602, and if the request is a write request, the procedure advances to step 2607. In determination step 2602, the cache control program 2501 refers to the cache control information 304, and determines whether the area to be read is cached. Actually, the area to be read can be determined as being cached if the area designated by the read request is included in the area specified by the cache source volume name 601, the start address 602 and the length 603 of the cache control information 304. If the area is cached, the procedure advances to step 2603, and if the area is not cached, the procedure advances to step 2607. In step 2603, the cache control program 2501 refers to the cache control information 304, specifies the area where the data of the area designated by the read request is cached, and reads the data from the specified area. For example, by taking a state where the status of the server cache is of the status stated in the cache control information 304 of FIG. 6, if the program receives a request to read the area specified by volume name Vol A, address 20 and length 10, the program can determine that the data is cached since this area is included in the area recorded in row 608, so that the program can determine that the cached data can be read from address 10 of the server flash A. In step 2604, the cache control program 2501 returns the data read in step 2603 to the database program 302.

In step 2605, the cache control program 2501 refers to the page tier information 520, determines whether the read target area designated by the read request received from the database program 302 is tier 1 or not, and if the area is not tier 1, the program ends the process. If the read target area is tier 1, the program performs a process to delete that area from the cache (step 2606), and then, the cache control program 2501 ends the process. The actual method for deleting the designated area from the cache deletes the information related to the area received by the read request from the cache control information 304. That is, if the cache status is the one shown in FIG. 6, and a read request of the area stated as volume name Vol A, start address 0 and length 10 is received from the database program 302, the program deletes row 607 if the data of this area is stored in tier 1.

In step 2607, the cache control program 2501 transfers the I/O request (read or write command) from the database program 302 to the storage system 260. In step 2608, the cache control program 2501 returns the result of process 2607 (that read data or write processing has been completed) to the database program 302. In step 2609, the cache control program 2501 refers to the page tier information 520, and determines whether the area subjected to the read or write processing in step 2607 is tier 1 or not. If the area is tier 1, the cache control program 2501 ends the process, and if the area is not tier 1, the procedure advances to step 2610. Step 2610 performs a similar process as step 2408 according to embodiment 1, that is, a process to allocate a free space for caching the data. The cache control program 2501 refers to the cache control information 304, searches for an area (free space) not being used within the cache destination volume, and allocates it as area for caching. If there is no free space, the cache control program 2501 refers to the last accessed time 606 of the cache control information 304, and deletes the area having the oldest last accessed time 606. In step 2611, the cache control program 2501 stores the data subjected to read or write processing in step 2607 to the area allocated in step 2610, and updates the cache control information 304. For sake of simplified description of the processes, it is assumed that the data of the area designated by the read request is all cached, or all not cached, but if the area designated by the read request includes a portion being cached and a portion not being cached, the read processing of the cached portion is performed by the processes of step 2603 and subsequent steps, and the read processing of the non-cached portion should be performed by the processes of step 2607 and subsequent steps.

According to the computer system of embodiment 2, the server is operated to cache the data not being placed onto a storage area of an upper-level tier in the storage system, and not to cache the data placed onto the storage area of the upper-level tier. As a result, the same data will not be stored in a duplicated manner in the server cache and the upper-level tier of the storage system, so that greater variety of data can be stored thereto. Accordingly, the I/O performance of the computer system can be improved as a whole.

The preferred embodiments of the present invention have been described, but the present embodiments are a mere example for better understanding of the present invention, and they are not intended to limit the scope of the invention to the preferred examples illustrated above. The modified examples can be combined with embodiment 2, or can be combined with other modified examples. The present invention can be carried out by other various embodiments. For example, the computer system disclosed in the preferred embodiments can be designed to include multiple servers and storage systems, and the components of the server or the storage system can include multiple CPUs, for example. The component referred to as a program according to the embodiments can also be realized by hardware using a hard-wired logic, for example. The various programs and control information within the embodiments can be provided by storing in a storage media such as a DVD, for example.

REFERENCE SIGNS LIST

101: Data A
102: Data B
103: Data C
104: Data D
200: Server
204: Flash memory drive
260: Storage system
267: SSD
268: HDD
280: Management server
302: Database program
303: Cache control program
304: Cache control information
410: Page migration program
405: Virtual volume information
501: Server cache status acquisition program
502: Storage tier information acquisition program
503: Page tier determination program
504: Page status information
505: Page tier policy
506: Page tier policy entry program

The invention claimed is:

1. A computer system comprising:
a storage system having a first storage media, and a second storage media which is a storage media having a higher access performance than the first storage media, a first memory, and a first processor;
a server having a server cache, a second memory, and a second processor; and
a management server having a third memory and a third processor;
wherein the first memory stores instructions that, when executed by the first processor, causes the first processor to:
provide to the server a volume having multiple fixed length areas to which a storage area from the first or the second storage media is allocated, and stores data written to the fixed length area from the server to the allocated storage area of the first or second storage media, and
manage volume management information that includes, for each fixed length area, a number of read accesses and a number of write accesses that has occurred within a certain period of time from the server to the fixed length area,
wherein the second memory stores instructions that, when executed by the second processor, causes the second processor to:
cache a portion of the data stored in the volume to the server cache, and
manage cache control information related to the cached data in the server cache, and
wherein the third memory stores instructions that, when executed by the third processor, causes the third processor to:
acquire the volume management information from the storage system,
acquire the cache control information from the server,
calculate, based on the volume management information and the cache control information, a server cache rate which is a ratio of data within the fixed length area being cached in the server cache for each fixed length area, and a read rate which is a ratio of a number of read accesses with respect to a sum of the number of read accesses and a number of write accesses that has occurred within the certain period of time from the server to the fixed length area, and
determine which storage area of the first and second storage media should be allocated to each fixed length area based on the server cache rate and the read rate.

2. The computer system according to claim 1, wherein when the read rate of the fixed length area exceeds a first threshold value, it is determined that the first storage media is allocated to the fixed length area.

3. The computer system according to claim 1, wherein when the read rate of the fixed length area falls below a second threshold value, it is determined that the second storage media is allocated to the fixed length area.

4. The computer system according to claim 1, wherein the second memory further stores instructions that, when executed by the second processor, causes the second processor to:
store and manage one or more objects to the volume
manage location information of each object specifying where in the volume said each of the object is stored, and
the third memory stores instructions that, when executed by the third processor, causes the third processor to:

compute the read rate and the server cache rate of each object based on the volume management information, the cache control information and the location information, and based on the read rate and the server cache rate of each object, determine to which storage media, the first storage media or the second storage media, the object is to be placed.

5. The computer system according to claim 1, wherein the first memory stores instructions that, when executed by the first processor, causes the first processor to, out of the multiple fixed storage length areas, cache data of a fixed length area to which the storage area of the first storage media is allocated to a portion of the storage area of the second storage media.

6. The computer system according to claim 5, wherein the third memory stores instructions that, when executed by the third processor, causes the third processor to:

acquire information related to a status of the plurality of fixed length areas at a designated time point, and after acquisition thereof, based on an instruction from a user, return the status of the plurality of fixed length areas to a status at the designated time point based on the acquired status of the plurality of the fixed length areas.

7. The computer system according to claim 6, wherein said information related to the status of the plurality of fixed length areas is one or more of the following information:

information stating whether the storage area allocated to the plurality of fixed length areas is from the first storage media or from the second storage media, information regarding the area to which data is cached to the server cache out of the plurality of fixed length areas, and information regarding the area to which data is cached in the storage area of the second storage media out of the fixed length area to which the storage area of the first storage media is allocated.

8. A method for controlling a computer system including a management server, a server having a server cache, and a storage system having a first storage media, and a second storage media which is a storage media having a higher access performance than the first storage media, the method comprising:

providing, by the storage system to the server, a volume having multiple fixed length areas to which a storage area from the first or the second storage media is allocated, and storing data written to the fixed length area from the server to the allocated storage area of the first or second storage media;

managing, by the storage system, volume management information that includes, for each fixed length area, a number of read accesses and a number of write accesses that has occurred within a certain period of time from the server to the fixed length area;

managing, by the server, cache control information to the data cached to the server cache when a portion of the data stored in the volume is cached to the server cache;

acquiring, by the management server, the volume management information and the cache control information, and calculating, by the management server, a server cache rate which is a ratio of data out of the fixed length area being cached in the server cache for each fixed length area, and a read rate which is a ratio of a number of read accesses with respect to a sum of the number of read accesses and a number of write accesses that has occurred within the certain period of time from the server to the fixed length area based on the acquired volume management information and the cache control information; and determining, by the management server, which storage area of the first and second storage media should be allocated to each fixed length area based on the server cache rate and the read rate.

9. The method for controlling a computer system according to claim 8, wherein when the read rate of the fixed length area exceeds a first threshold value, it is determined that the first storage media is allocated to the fixed length area.

10. The method for controlling a computer system according to claim 8, wherein when the read rate of the fixed length area falls below a second threshold value, it is determined that the second storage media is allocated to the fixed length area.

11. The method for controlling a computer system according to claim 8, further comprising:

storing and managing, by the server, one or more objects to the volume;

managing, by the server, location information of each object specifying where in the volume said each of the object is stored; and computing, by the management server, the read rate and the server cache rate of each object based on the volume management information, the cache control information and the location information, and based on the read rate and the server cache rate of each object, determining to which storage media, the first storage media or the second storage media, the object is to be placed.

12. The method for controlling a computer system according to claim 8, further comprising caching, by the storage system, data of a fixed length area to which the storage area of the first storage media is allocated to a portion of the storage area of the second storage media.

13. The method for controlling a computer system according to claim 12, wherein acquiring, by the management server, information related to a status of the plurality of fixed length areas at a designated time point, and after acquisition thereof, based on an instruction from a user, returning the status of the plurality of fixed length areas to a status at the designated time point based on the acquired status of the plurality of the fixed length areas.

14. The method for controlling a computer system according to claim 13, wherein said information related to the status of the plurality of fixed length areas is one or more of the following information:

information stating whether the storage area allocated to the plurality of fixed length areas is from the first storage media or from the second storage media, information regarding the area to which data is cached to the server cache out of the plurality of fixed length areas, and information regarding the area to which data is cached in the storage area of the second storage media out of the fixed length area to which the storage area of the first storage media is allocated.

15. A computer system comprising:

a storage system having a first storage media, and a second storage media which is a storage media having a higher access performance than the first storage media, a first memory, and a first processor;

a server having a server cache, a second memory, and a second processor; and a management server having a third memory, and a third processor;

wherein the first memory stores instructions that, when executed by the first processor, causes the first processor to:

provide the server a volume having multiple fixed length areas to which a storage area from the first or the second storage media is allocated, and store data written to the fixed length area from the server to the allocated storage area of the first or second storage media, wherein the second memory stores instructions that, when executed by the second processor, causes the second processor to:

cache a portion of the data stored in the volume to the server cache, and manage cache control information related to the cached data in the server cache, wherein the third memory stores instructions that, when executed by the third processor, causes the third processor to:

acquire information from the storage system on whether the storage area allocated to each of the plurality of fixed length areas is of the first storage media or of the second storage media, and transmit the information to the server, and wherein the second memory stores instructions that, when executed by the second processor, further causes the second processor to:

when the storage area allocated to the fixed length area is determined as the first storage media, cache the data in the fixed length area to the server cache, and when storage area allocated to the fixed length area is determined as the second storage media, not cache the data in the fixed length area to the server cache based on the information transmitted to the server.

* * * * *